Jan. 24, 1928.

C. P. EISENHAUER 1,657,349

BEARING

Filed Dec. 4, 1925    2 Sheets-Sheet 1

INVENTOR
CHARLES P. EISENHAUER,
BY Toulmin & Toulmin,
ATTORNEYS.

Jan. 24, 1928.  
C. P. EISENHAUER  
BEARING  
Filed Dec. 4, 1925
1,657,349
2 Sheets-Sheet 2
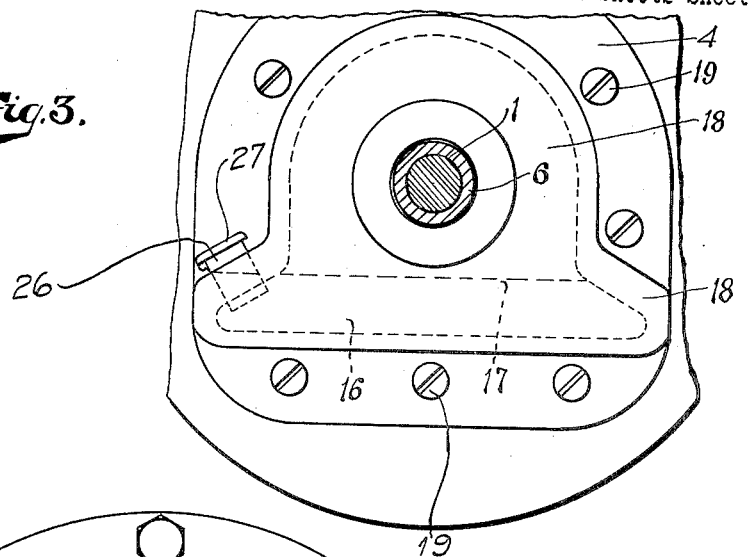
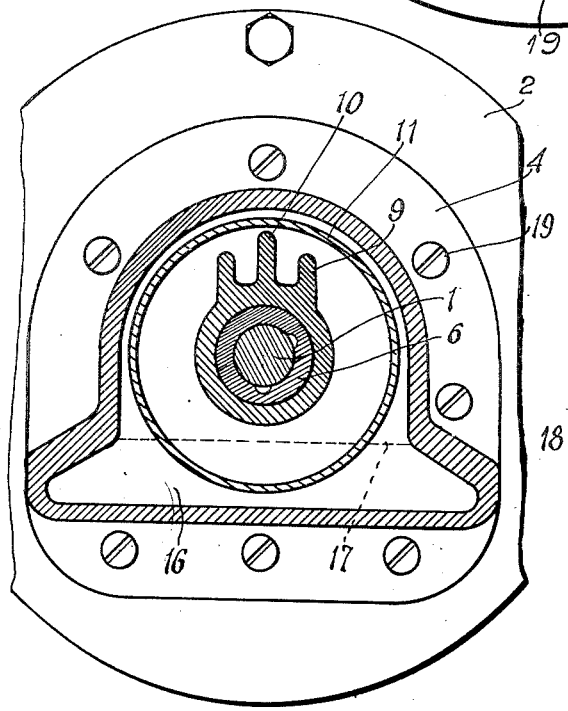
INVENTOR  
CHARLES P. EISENHAUER,  
BY Toulmin & Toulmin,  
ATTORNEYS.

Patented Jan. 24, 1928.

1,657,349

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

BEARING.

Application filed December 4, 1925. Serial No. 73,090.

My invention relates to a bearing and means of lubrication thereof.

It is the object of my invention to provide means of lubricating a bearing which will be self-contained and self-controlled, so that the amount of lubrication delivered will depend upon the speed of the moving part carried by the bearing.

It is a further object to provide such a bearing that will not need attention except at long intervals, which will be self-contained and dust-proof as well as leak-proof.

My bearing is particularly adapted to electric motors carrying fans and other similar apparatus where the motor is used under conditions which prevent lubrication at frequent intervals.

Referring to the drawings:

Figure 2 is a section on the line 2—2 of Figure 1;

Figure 3 is an end elevation of the outside of the motor housing with the shaft in section.

Figure 1:
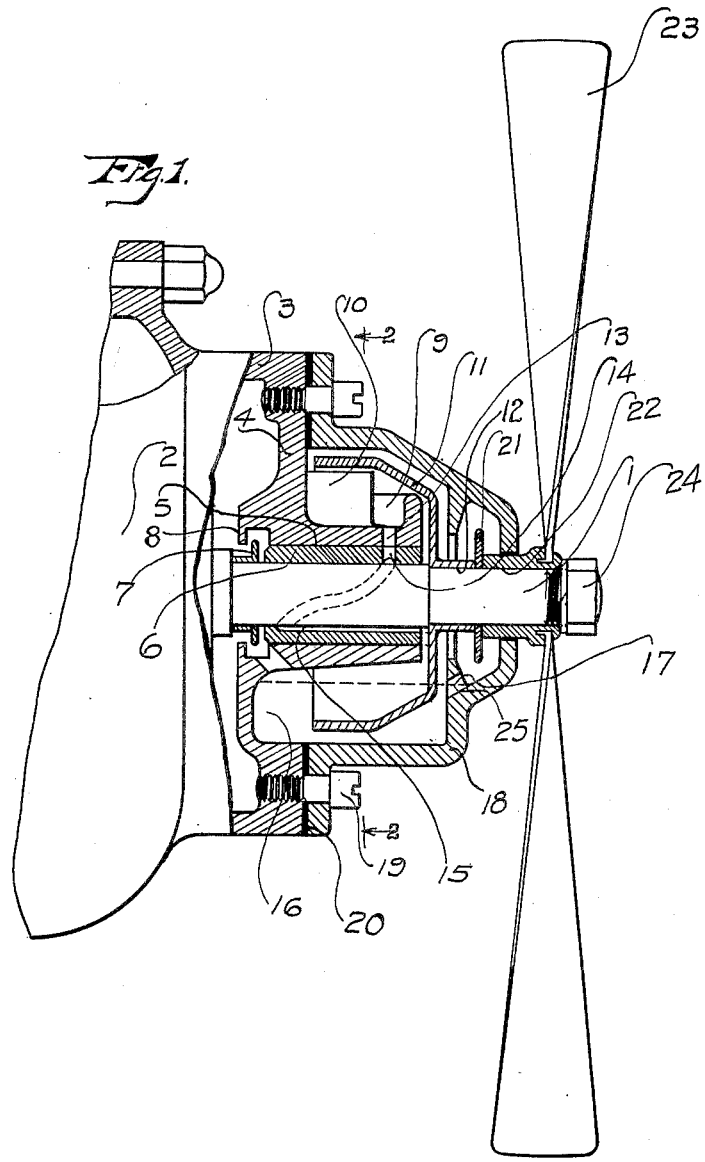
Figure 1 is a side elevation of one end of the motor partially in section.

Referring to the drawings in detail, 1 is the armature shaft of an electric motor 2. This motor is provided with a cage 3 having a vertical end portion 4 and a sleeve portion 5. Within this sleeve portion is a bearing sleeve 6 supporting the shaft 1. On the shaft is carried a splash collar 7 which is surrounded by an overhanging ledge or ring 8 of the end member 4. The sleeve 5 is provided with a cup on its upper surfaces, which cup is formed by a lip 9 extending from the end member 4 outwardly to the end of the sleeve and back again.

In this cup is an upwardly extending flange 10 which extends closely adjacent to the overhanging oil elevating cup 11, which is carried on the outer end of the shaft, as at 12. In the bottom of the cup 9 is an aperture or passageway 13 which coincides with a passageway 14 in the bearing member 6. This passageway 14 passes around the shaft 1 to a point where it communicates with the passageway 15 that leads into the chamber 16 containing the supply of lubricant, which is maintained at a point, designated 17.

It will be noted that the passageway 14 passes spirally from one end of the bearing support to the other, thereby lubricating the shaft throughout the length of its bearing support. The oil thus lubricating the bearing drops down into the reservoir 16. This reservoir 16 is formed by the cup-shaped housing 18 bolted to the end member 4 by the bolts 19 and sealed thereto by a gasket 20.

On the outer end of the shaft is provided a splash plate 21 and beyond that a hub 22 for the fan 23, which hub is held in position by the nut 24 on the end of the armature shaft. A passageway 25 leads from the vicinity of the splash plate to the reservoir.

It will be noted that the rotation of the shaft carrying with it the oil-elevating cup 11 elevates the oil to the top of the shaft where it is removed by the closely adjacent wiper 10 so that it runs down into the cup 9 and passes through the passageways 13 and 14 and out the passageway 20, thus lubricating the shaft and, at the same time, returning to the reservoir (Figure 3).

It will be noted that the greater the speed and therefore the greater the need for lubrication, the greater the quantity of oil so elevated and so returned to the shaft.

The reservoir is filled through the filler spout 26 which has a cover 27.

It will be understood that I desire to comprehend within my invention such modifications as may be necessary to adapt it to varying conditions and uses.

Having thus fully described my invention, what I claim as new and desire to secure by Letters Patent, is:

1. In combination, a frame having a sleeve with a cup on the top of the sleeve, a bearing within said sleeve, a shaft carried within the bearing, said sleeve and bearing having a passageway adapted to convey lubricant from the cup spirally around the shaft from one end of the bearing portion to the other, and thence back to the first end for delivery of the lubricant to a reservoir below the shaft, a reservoir below the shaft formed by a detachable cup-like member mounted on the end of the frame having the sleeve and an oil-elevating cup dipping in the reservoir and passing over the first mentioned cup carried by the shaft, and a wiper in the first mentioned cup closely adjacent the interior of the oil-elevating cup for removing the oil therefrom.

2. In combination, a frame having a sleeve with a cup on the top of the sleeve, a bearing within said sleeve, a shaft carried within the bearing, said sleeve and bearing having a passageway adapted to convey lubricant from the cup spirally around the shaft from one end of the bearing portion to the other, and thence back to the first end for delivery of the lubricant to a reservoir below the shaft, a reservoir below the shaft formed by a detachable cup-like member mounted on the end of the frame having the sleeve and an oil-elevating cup dipping in the reservoir and passing over the first mentioned cup carried by the shaft, and a wiper in the first mentioned cup closely adjacent the interior of the oil-elevating cup for removing the oil therefrom, and splash members on either end of the shaft at either end of the bearing adapted to return the lubricant on the shaft to the reservoir.

3. In combination, a frame having a sleeve with a cup on the top of the sleeve, a bearing within said sleeve, a shaft carried within the bearing, said sleeve and bearing having a passageway adapted to convey lubricant from the cup spirally around the shaft from one end of the bearing portion to the other, and thence back to the first end for delivery of the lubricant to a reservoir below the shaft, a reservoir below the shaft formed by a detachable cup-like member mounted on the end of the frame having the sleeve and an oil-elevating cup dipping in the reservoir and passing over the first mentioned cup carried by the shaft, and a wiper in the first mentioned cup closely adjacent the interior of the oil-elevating cup for removing the oil therefrom, and splash members on either end of the shaft at either end of the bearing adapted to return the lubricant on the shaft to the reservoir, said frame having means for permitting the return passage of the lubricant to the reservoir.

4. In combination, an electric motor having a cage, said cage having a vertical end portion and a sleeve portion, a bearing sleeve within the sleeve portion, said sleeve portion having a cup mounted thereon, said sleeve portion and bearing sleeve having a passageway adapted to convey lubricant from the cup spirally around the shaft from one end of the bearing sleeve to the other and back again, a reservoir below the shaft, and an oil elevating cup carried by the shaft dipping in the reservoir and passing over the first mentioned cup, a wiper in the first mentioned cup closely adjacent the interior of the oil elevating cup for removing the oil therefrom, said vertical end portion forming a part of said first mentioned cup and preventing oil carried by said elevating cup from reaching said electric motor.

In testimony whereof, I affix my signature.

CHARLES P. EISENHAUER.